United States Patent [19]
Gaborski et al.

[11] Patent Number: 5,574,803
[45] Date of Patent: Nov. 12, 1996

[54] CHARACTER THINNING USING EMERGENT BEHAVIOR OF POPULATIONS OF COMPETITIVE LOCALLY INDEPENDENT PROCESSES

[75] Inventors: Roger Gaborski, Pittsford, N.Y.; Andrew Assad, Champagne, Ill.; Thaddeus Pawlicki, Akron, N.Y.

[73] Assignee: Eastman Kodak Company, Rochester, N.Y.

[21] Appl. No.: 739,649

[22] Filed: Aug. 2, 1991

[51] Int. Cl.$^6$ .................................................. G06K 9/44
[52] U.S. Cl. .................................................. 382/259
[58] Field of Search ........................... 382/55, 9, 205, 382/259, 302, 308

[56] References Cited

U.S. PATENT DOCUMENTS

| | | | |
|---|---|---|---|
| 3,339,179 | 8/1967 | Shelton, Jr. et al. | 340/146.3 |
| 3,522,586 | 8/1970 | Kiji et al. | 340/146.3 |
| 3,541,511 | 11/1970 | Genchi et al. | 340/146.3 |
| 3,571,584 | 3/1971 | Bolie | 235/197 |
| 3,609,685 | 9/1971 | Deutsch | 340/146.3 AE |
| 3,613,080 | 10/1971 | Angeloni, Sr. et al. | 340/146.3 AC |
| 3,753,229 | 8/1973 | Beun et al. | 340/146.3 MA |
| 3,846,754 | 11/1974 | Oka et al. | 340/146.3 H |
| 3,940,737 | 2/1976 | Beun | 340/146.3 H |
| 3,973,239 | 8/1976 | Kakumoto et al. | 340/146.3 AG |
| 4,034,344 | 7/1977 | Saraga et al. | 340/146.3 H |
| 4,093,941 | 6/1978 | Bryan et al. | 340/146.3 AE |
| 4,162,482 | 7/1979 | Su | 340/146.3 H |
| 4,204,232 | 5/1980 | Mizuno | 358/260 |
| 4,520,505 | 5/1985 | Yamamoto et al. | 382/55 |
| 4,539,704 | 9/1985 | Pastor | 382/55 |
| 4,574,357 | 3/1986 | Pastor et al. | 364/518 |
| 4,665,441 | 5/1987 | Sakaue et al. | 358/280 |
| 4,748,443 | 5/1988 | Uehara et al. | 340/751 |
| 4,809,348 | 2/1989 | Meyer et al. | 382/49 |
| 5,023,920 | 6/1991 | Breu | 382/60 |
| 5,062,142 | 10/1991 | Meckley | 382/27 |

*Primary Examiner*—Leo Boudreau
*Assistant Examiner*—Andrew W. Johns
*Attorney, Agent, or Firm*—Peyton C. Watkins

[57] ABSTRACT

A character bit map is skeletonized using competitive locally independent processes (CLIPs) by defining for each foreground pixel an individual CLIP with a center location and radius defining the pixels included in the CLIP. In iterative cycles, each CLIP varies its center location and radius over predetermined ranges to produce a predetermined number of permutations thereof, computes a trial fitness value for each permutation, the trial fitness value being rewarded and penalized in accordance with foreground and background pixels included in the CLIP and penalized for each pixel included in both the CLIP and in another CLIP of greater fitness value. Each CLIP adopts the maximum trial fitness value as its next fitness value along with the corresponding center location and radius. Each CLIP is eliminated if its next fitness value falls below a predetermined minimum value. Whenever an iterative cycle fails to produce a change in the number or radii of the CLIPs greater than a predetermined threshold, the center locations of all surviving CLIPs are output as a skeleton character map.

20 Claims, 15 Drawing Sheets

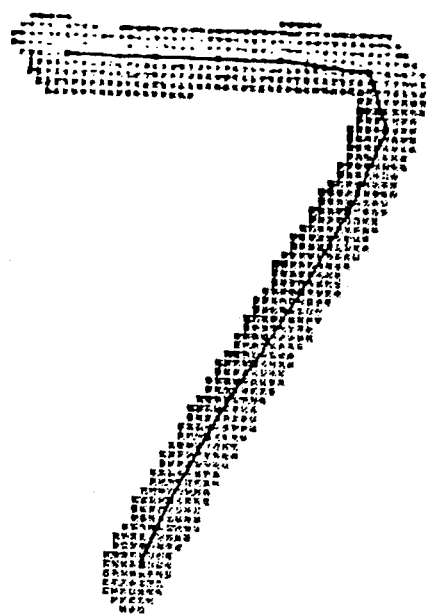
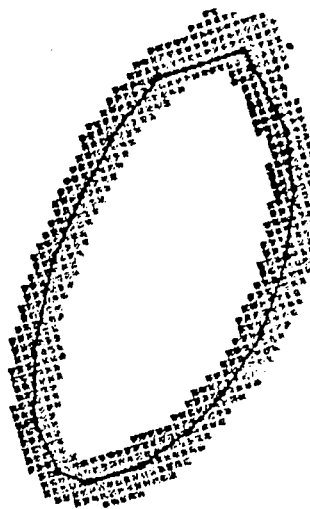
Fig. 15a                    Fig. 15b
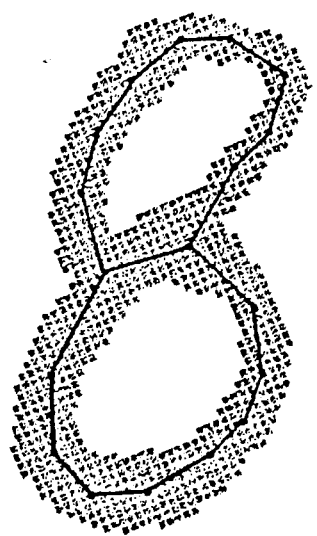
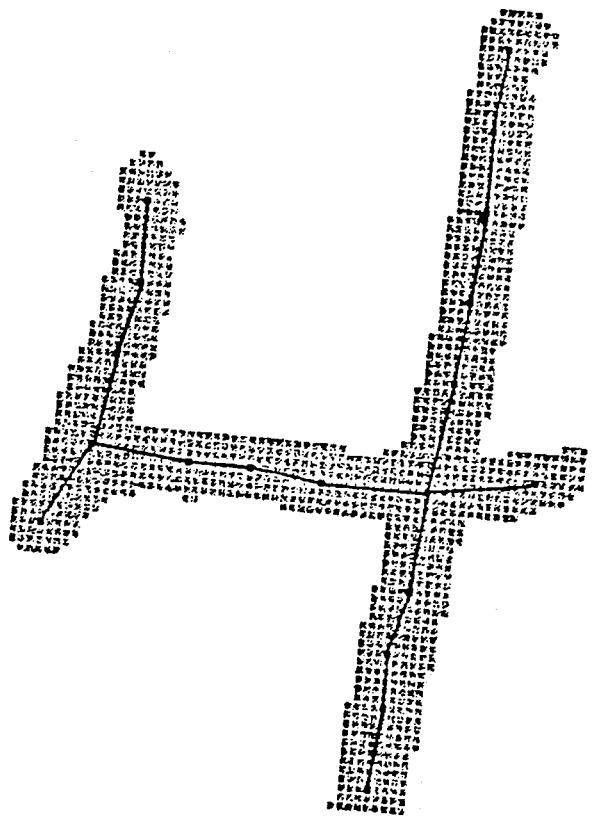
Fig. 15c                    Fig. 15d

CHARACTER THINNING USING EMERGENT BEHAVIOR OF POPULATIONS OF COMPETITIVE LOCALLY INDEPENDENT PROCESSES

BACKGROUND OF THE INVENTION

1. Technical Field

The invention is a method and apparatus useful in optical character recognition for producing skeletonized character images from character bitmaps using a thinning process which is based on the emergent behavior of populations of competitive locally independent processes (CLIP's).

2. Background Art

Optical character recognition processes often require that an image or bitmap of an unknown character be thinned or skeletonized before the optical character recognition process can begin its attempt to recognize the character. Numerous techniques are known for performing optical character recognition in connection with a character thinning process. Such prior art character thinning techniques suffer from a number of significant disadvantages. First, such techniques are susceptible to noise along the boundaries of an unknown character. For example, the images of some unknown characters have burrs or spurs in them. Such burrs or spurs in the unknown character often produce what appears to be an actual character stroke in the corresponding thinned or skeleton character image, thus in many cases leading to an incorrect identification of the unknown character. Often, such techniques are computationally expensive and not necessarily adapted to parallel processing.

What is needed is a character thinning process which is nearly impervious to boundary noise (such as burrs or spurs) in an unknown character image, is computationally efficient and is easily implemented in a highly parallel architecture.

DISCLOSURE OF THE INVENTION

In the present invention, a skeletonized image of an unknown character bitmap is produced by assigning a competitive locally independent process (CLIP) to each "ON" pixel in the unknown character bitmap and permitting the resulting large population of CLIPs to compete with one another until a set of CLIPs remain whose centers trace the skeletonized image of the character bitmap. During each cyclic iteration of the process, the fitness of each CLIP is computed as a function of the location of the center of the CLIP and of its radius. This function is the sum of three functions, namely a background function which penalizes the fitness based upon the number of "OFF" pixels within the CLIP, a foreground function which rewards the fitness based upon the number of "ON" pixels in the CLIP and a neighbor function which penalizes the fitness based upon the number of pixels within the CLIP which are shared with other CLIPs having a greater fitness. Each cyclic iteration of the process consists of a nested loop in which the two dimensional location of the center of each CLIP as well as its radius is varied over a set of predetermined ranges and for each permutation thereof a trial fitness is computed. The permutation of the parameters of center location and radius resulting in the greatest fitness is stored as the next parameters used during the next cyclic iteration. Thus, each of the CLIPs can grow or shrink or shift its position until the emergent behavior of the entire population results in a final set of CLIPs whose centers trace the correct skeletonized image of the unknown character. The process is complete when the next iteration produces no significant variations in CLIP locations or radii.

The CLIP-based character thinning process of the invention is nearly imperious to boundary noise, computationally efficient (using only integer additions and multiplications) and is readily implemented in a highly parallel architecture. Unlike prior art character thinning techniques can experience ambiguity in determining when to stop the thinning process, the present invention has an easily detectable termination condition, namely that cyclic iteration in which no significant change in CLIP location or radius occurs.

BRIEF DESCRIPTION OF THE DRAWINGS

FIGS. 15a through 15d depict the results of the character thinning process of the invention carried out on various character bitmaps.

MODES FOR CARRYING OUT THE INVENTION

A CLIP is a process having a center location (x,y) in an image bitmap, a radius r (in pixels), and an associated fitness f. As long as a CLIP maintains a positive fitness value, it continues to exist. When a CLIP's fitness becomes negative or zero, it is removed from the image bitmap leaving an empty position at its (x,y) center location into which a surviving CLIP may migrate. At any point in time (i.e. at any iteration of the process) a CLIP may either increase its radius or change its center location by moving to any vacant neighboring pixel in the set of its eight adjacent pixels, or do both. A CLIP will only move or increase its radius during a given iteration if that action will increase its fitness. The basic rule governing the behavior of a CLIP is that it always attempts to maximize its fitness.

The magnitude or fitness of a CLIP is defined as a sum of three functions as shown below in Equation (1).

$$f = B(x,y,r) + F(x,y,r) + N(x,y,r) \tag{1}$$

Fitness is essentially a qualitative measure of a CLIP's local environment designated by its (x,y) center location and radius r. In general, if a CLIP is far away from background pixels, surrounded by foreground pixels, and does not overlap with CLIPs of greater fitness, it will have a high positive fitness. These three conditions are measured by the functions B, F, and N respectively in Equation (1). These functions, also referred to as the background, foreground and neighbor functions, will be discussed in detail later.

Figure 1:
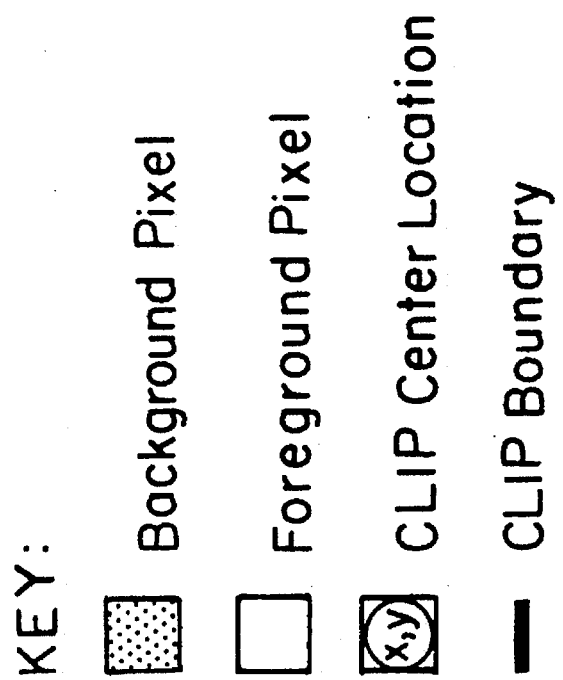
FIG. 1 is a diagram of a CLIP superimposed on a bitmap.
Figure 1:
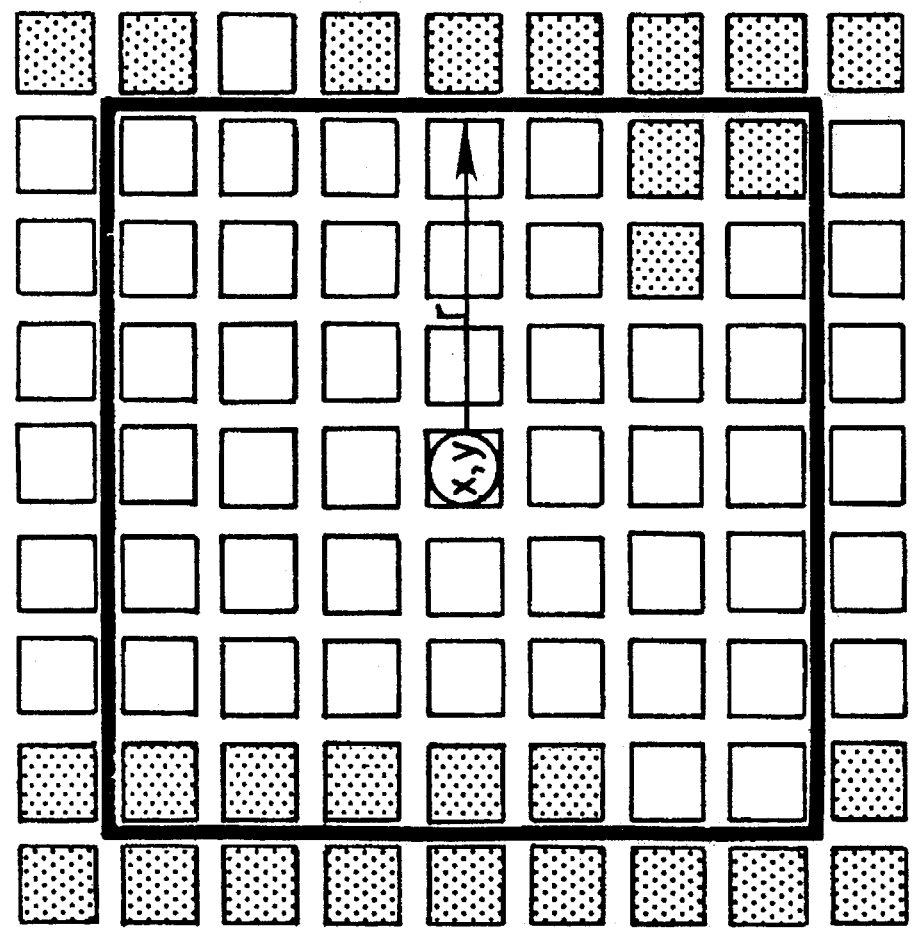

FIG. 1 illustrates a CLIP and a typical local environment. The CLIP shown in this figure has a radius of 3 pixels. Note that although the CLIP has a square shape, the term "radius" is used to describe its size. In an alternative embodiment, the CLIPs are circular in shape.

Figure 2:
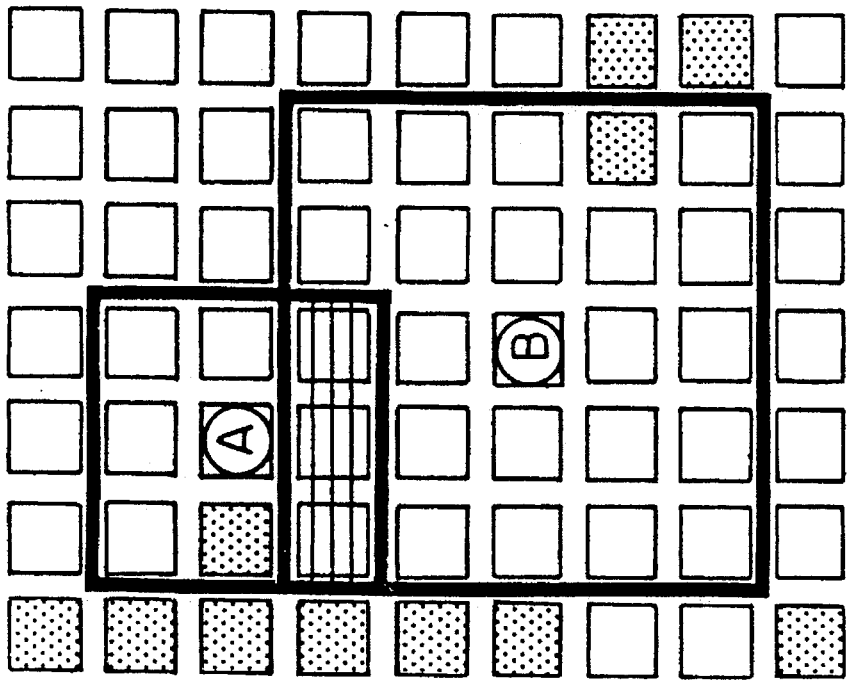
FIG. 2 is a diagram of overlapping CLIPs in a bitmap.

Also associated with each CLIP is an area of ownership in the image bitmap. For example, in FIG. 1, the CLIP depicted owns the pixels, both foreground and background, within its CLIP boundary. When two CLIPS overlap each other, the CLIP with the greater fitness is assigned ownership of the pixels in the overlapping region. This is illustrated in FIG. 2 where the three pixels contained in the overlapping region are assigned to CLIP B since it has a greater fitness than CLIP A.

BACKGROUND FUNCTION $B(x,y,r)$ produces a negative impact on a CLIP's fitness. The more background pixels there are in a CLIP's local environment and the closer they are to the CLIP, the more negative $B(x,y,r)$ becomes. This function tends to drive CLIPs away from background pixels or in the case of a character bitmap, away from the edges of the character. It is defined as follows in Equation (2):

$$B(x,y,r) = \sum_{i=x-r}^{x+r} \sum_{j=y-r}^{y+r} B'(x,y,i,j,r) \quad (2)$$

The function B' reflects the effect of a background pixel at point (i,j) in the local environment of a CLIP at pixel (x,y) on the fitness of that CLIP. This function is defined below in Equation (3):

$B'(x,y,i,j,r)=0$ if $(i,j)$ is not a background pixel or $(i, j)$ is not owned by CLIP centered at $(x,y)$; (3)

Figure 3:
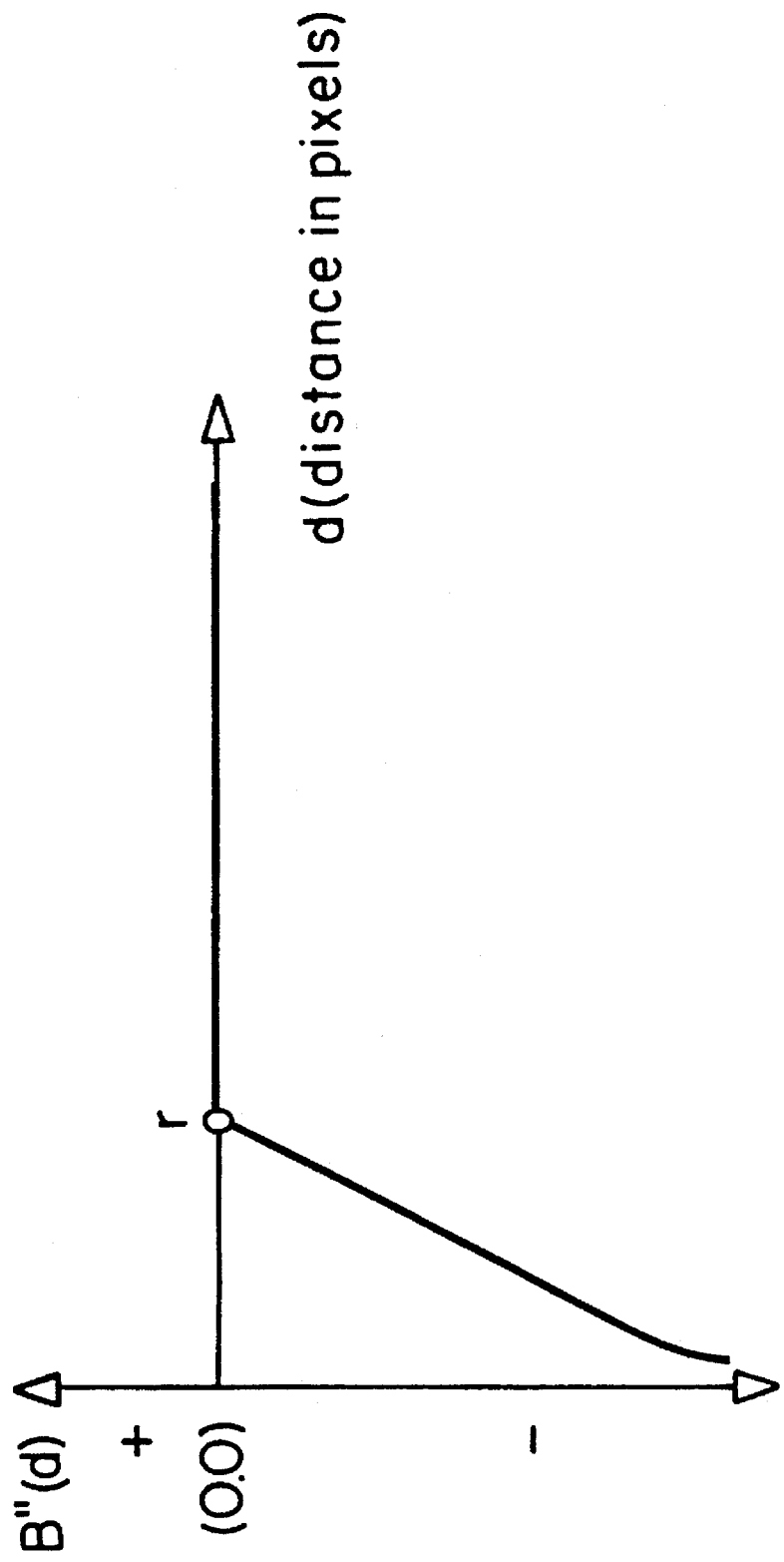
FIG. 3 is a graph of a function employed in computing the background function.

$=B''(\text{distance}(x,y,i,j),r)$ otherwise where distance(x,y,i,j)="manhattan" distance which is estimated by determining which one of the r concentric squares around the CLIP center location (x,y) contains the pixel (i,j). For example, if a given pixel is in the third concentric square around a particular CLIP center location, its distance with respect to that CLIP is estimated as three. In an alternative embodiment, $$\text{distance}(x,y,i,j)=SQRT((x-i)^2+(y-j)^2) \quad (4)$$

which is the Euclidean distance between points (x,y) and (i,j).
The function B" is shown below in FIG. 3. Note that B" approaches negative infinity as the distance between (x,y) and (i,j) goes to zero. This implies that a CLIP can never exist on a background pixel location. Background pixels farther away than r pixels from a CLIP's (x,y) location are not even considered by the CLIP in its fitness calculation. This is reflected in the curve of FIG. 3 since B"=0 for all d>r.

FOREGROUND FUNCTION $F(x,y,r)$ is the function which measures the positive effect of the foreground pixels in a CLIP's local environment on that CLIP's fitness. The more foreground pixels there are in a CLIP's local environment and the closer they are to the CLIP, the greater F becomes. Thus, CLIPs will tend to move to locations in the bitmap which are foreground pixels (in fact, they can only exist while on a foreground pixel) and are surrounded by as many foreground pixels within their radii, r, as possible. Equation (5) defines the foreground function.

$$F(x,y,r) = \sum_{i=x-r}^{x+r} \sum_{j=y-r}^{y+r} F'(x,y,i,j,r) \quad (5)$$

The function F' measures the effect of a foreground pixel at point (i,j) in the local environment of a CLIP at point (x,y) on the CLIP's fitness. Equation (6) defines F'.

$F'(x,y,i,j,r)$ = 0 if $(i,j)$ is not a foreground pixel or $(i,j)$ is not owned by CLIP centered at $(x,y)$; (6)

= $F''(\text{distance}(x,y,i,j),r)$ otherwise.

Figure 4:
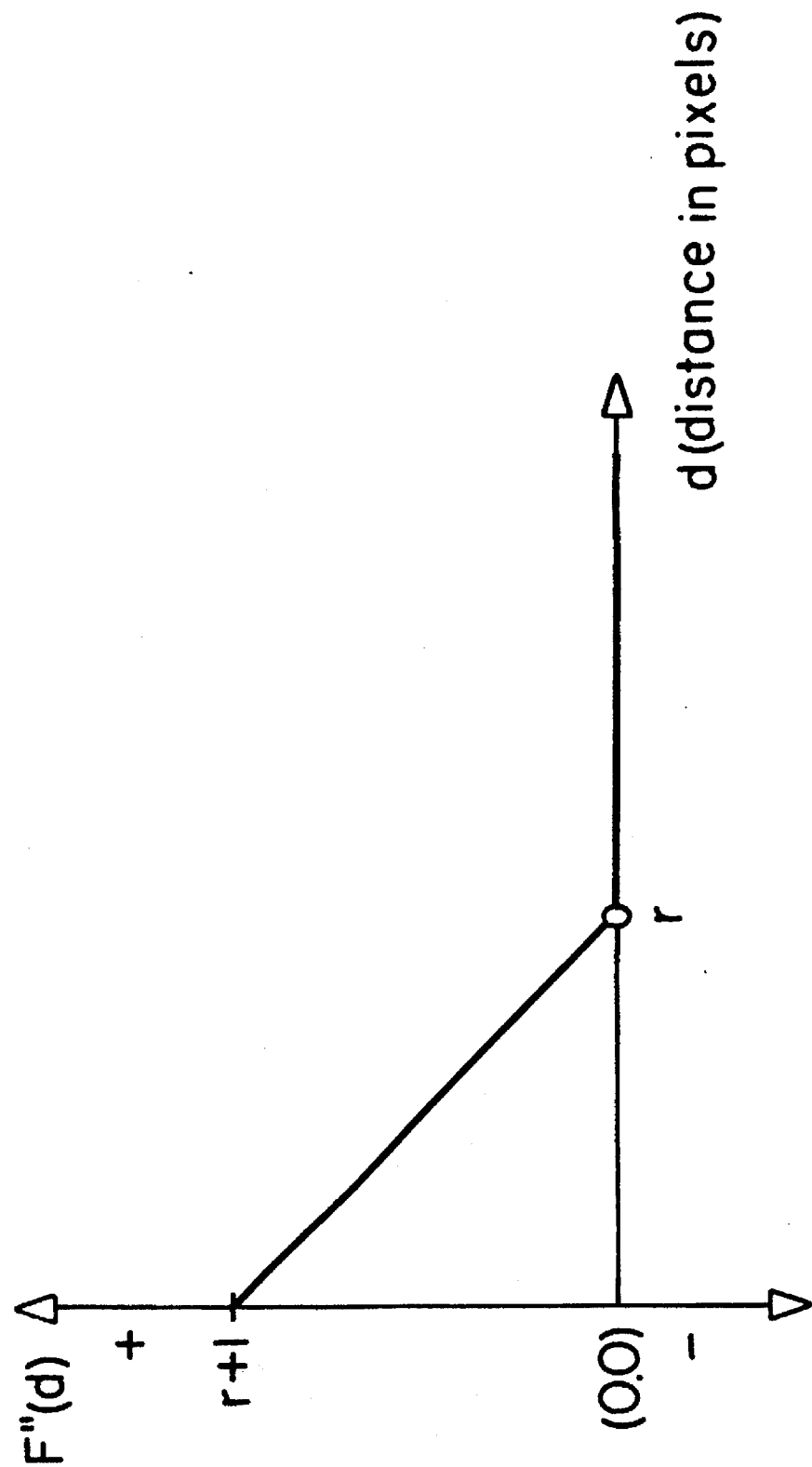
FIG. 4 is a graph of a function employed in computing the foreground function.

As shown in FIG. 4, the function F" is nearly the negative of B". However, unlike B", F" is not asymptotic to the y-axis. Thus, a foreground pixel which a CLIP exists on will only add a finite value (shown as the y-intercept, r+1, in FIG. 4) to that CLIP's fitness. This ensures that a CLIP will not be guaranteed existence simply because it is located on a foreground pixel. Analogous to the background function, foreground pixels which are farther away than r pixels from a CLIP's center location do not affect that CLIP's fitness since F"=0 for all d>r.

NEIGHBOR FUNCTION

The neighbor function, $N(x,y,r)$, measures the effect of a CLIP's overlapping neighbor CLIPs on its fitness. Each pixel in a CLIP's local environment which is owned by an overlapping neighbor CLIP with a higher fitness negatively impacts that CLIP's fitness. The neighbor function is defined below in Equation (7):

$$N(x,y,r) = \sum_{i=x-r}^{x+r} \sum_{j=y-r}^{y+r} N'(x,y,i,j,r) \quad (7)$$

N' measures the effect of a single pixel at point (i,j) in the local environment of a CLIP which is not owned by that CLIP on that CLIP's fitness. This effect is defined below in Equation (8):

$N'(x,y,i,j)$ = 0 if the pixel at $(i,j)$ is owned by (8)
CLIP centered at $(x,y)$;

= −1 otherwise

For example, looking back at FIG. 2, which depicts overlapping CLIPs, the neighbor function calculation for CLIP A would contribute −3 to CLIP A's fitness value since there are three pixels in A's local environment which are owned by CLIP B.

However, in many cases the more significant impact from overlapping CLIPs derives not from the neighbor function but implicitly from the foreground function. According to the foreground function, a low fitness CLIP which is overlapped by a higher fitness CLIP is denied the benefit of any foreground pixels in the overlapping region since it does not own them. Thus, during successive iterations of the process of the invention, lower fitness CLIPs tend to get squeezed off of the bitmap as the higher fitness CLIPs expand to increase the amount of foreground pixels in their local environments. Given a population of CLIPs behaving as described above, one can observe an overall trend where large, high-fitness CLIPs expand and increase their fitness and small, low-fitness CLIPs become less and less fit (as a result of losing ownership of the foreground pixels in their local environment to the higher fitness CLIPs) until ultimately, their fitness become negative and they are removed from the bitmap. This behavior, in conjunction with the background function which tends to drive CLIPs away from the edges of a character bitmap and towards the middle of a stroke, provides the basic mechanism for the thinning process of the invention.

CHARACTER THINNING PROCESS

The CLIP-based character thinning process of the invention described is nearly impervious to boundary noise, computationally efficient (utilizing only integer additions and multiplications), and could easily be implemented in a parallel hardware architecture.

A distinguishing feature of the CLIP-based character thinning process of the invention is its reliance on the emergent behavior of a population of locally independent processes. The invention exerts no explicit global control over the CLIPs to produce a skeleton. Instead, each CLIP on the bitmap simply exists and competes within its own local environment trying to maximize its fitness as described previously. The result which emerges from a population of CLIPs behaving in this manner is a sparsely populated image bitmap where surviving CLIPs are centered in the character strokes and can be easily connected to form a skeleton. FIGS. 5 through 10 illustrate a typical thinning sequence in accordance with the invention where an initially overcrowded CLIP population prunes itself down to form a stable character skeleton configuration.

Figure 5:
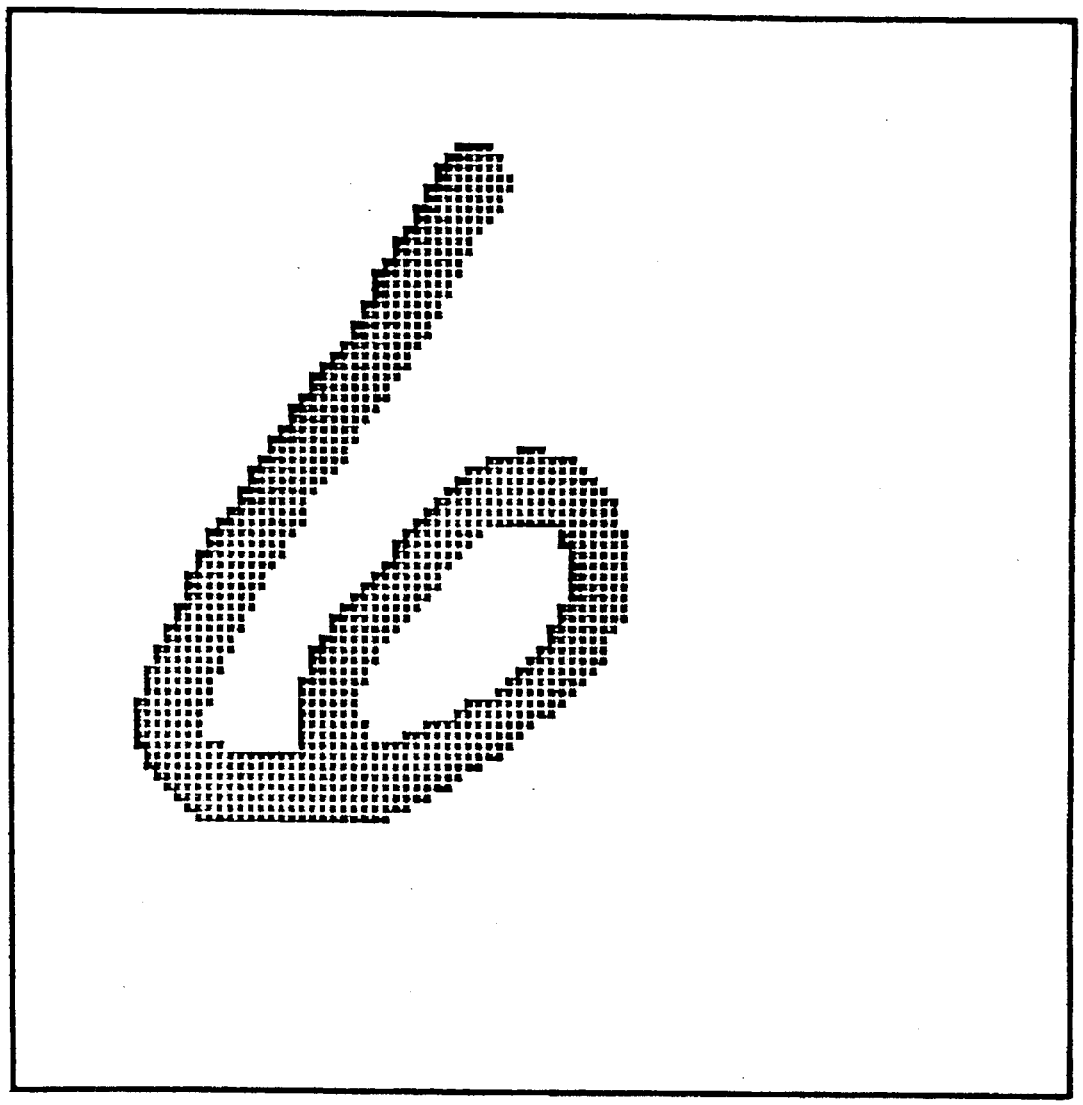
FIGS. 5 through 10 depict the progress of the character thinning process of the invention at selected cyclic iterations thereof in thinning an actual binary character bitmap.

FIG. 5 depicts the initial configuration of the thinning process for a handwritten '6' character. CLIPs (whose center locations are indicated by dark squares) are placed on every foreground pixel (indicated by light squares) in the image bitmap. Only one CLIP is placed on each foreground pixel since no two CLIPs can share the same (x,y) center location. This is the only restriction placed upon CLIP overlapping. Each CLIP begins with a radius r=1.

Figure 6:
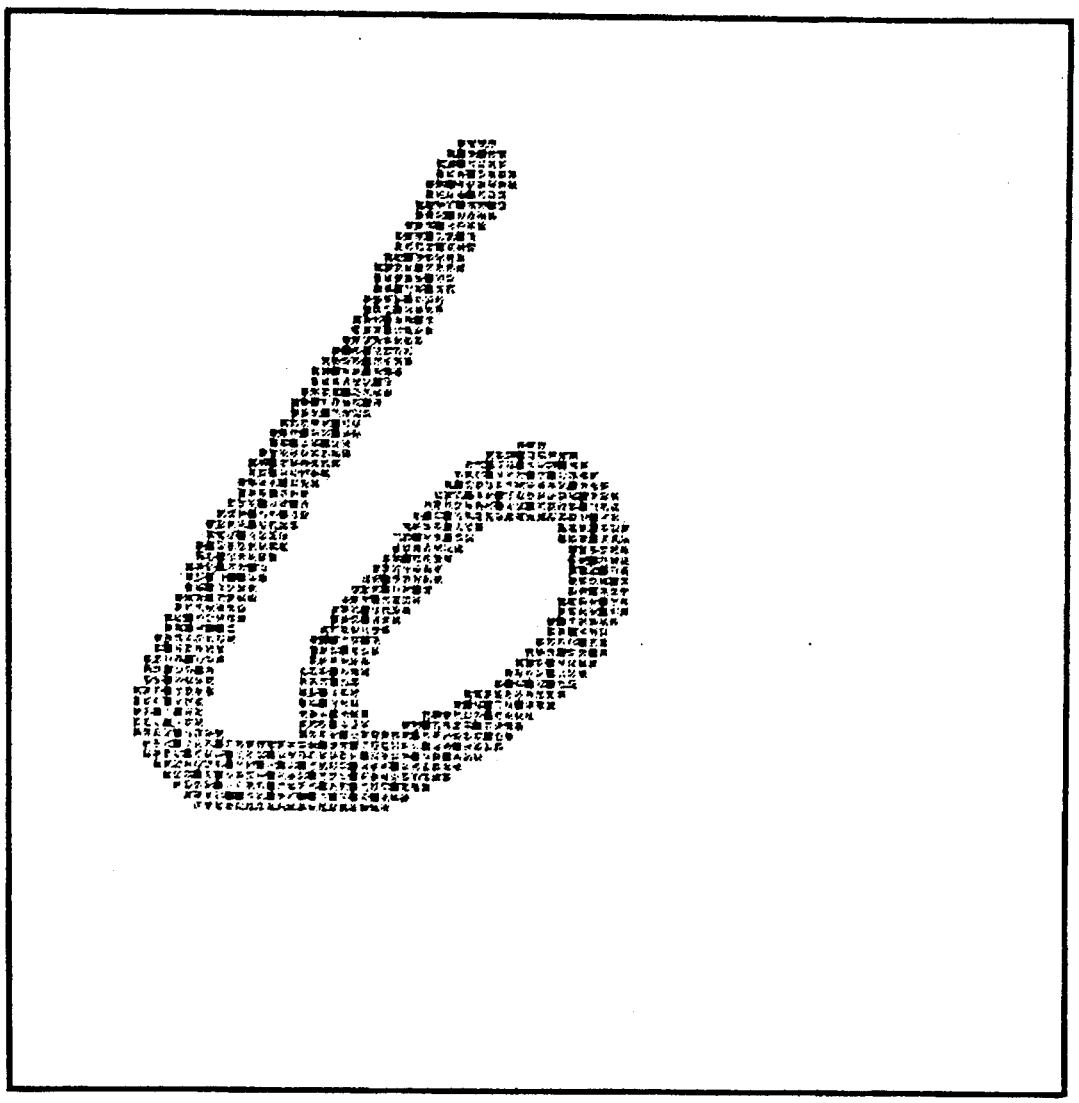

In FIG. 6, after only one iteration (i.e. one calculation of each CLIP's fitness and a possible action—move, expand, or die), less than half of the original population has survived. Nearly all of the CLIPs located on boundary pixels have been removed from the bitmap as a result of their close proximity to numerous background pixels (indicated by the white regions in the figures) and the resultant highly negative impact from the background function on their fitness calculations. Due to the initial overcrowded conditions, a large number of CLIPs located in seemingly safe locations near the middle of a character stroke have also failed to survive. Too many CLIPs are overlapping with each other and the neighbor function takes its toll when there are no free pixels to move to.

Figure 7:
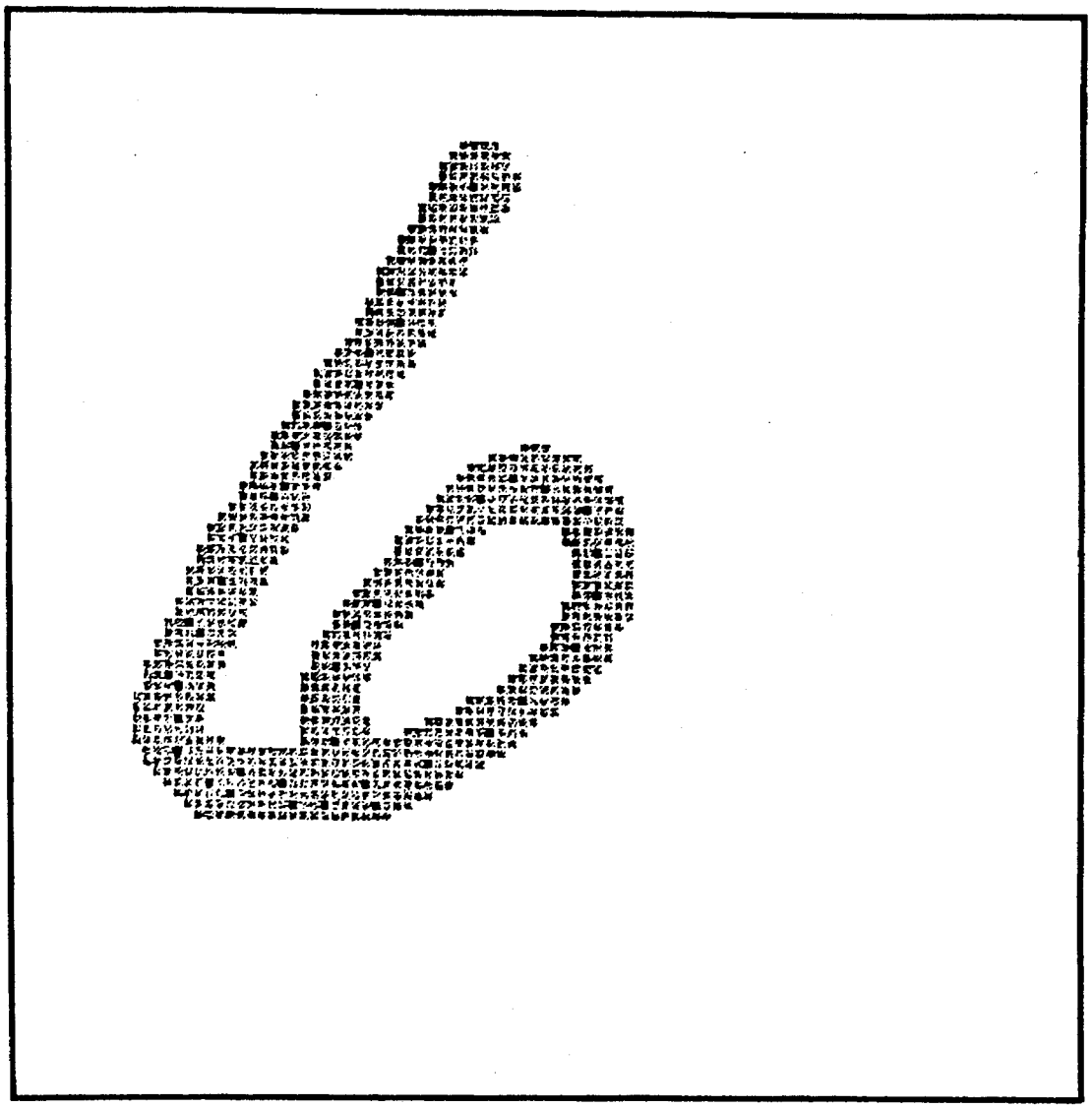
Figure 8:
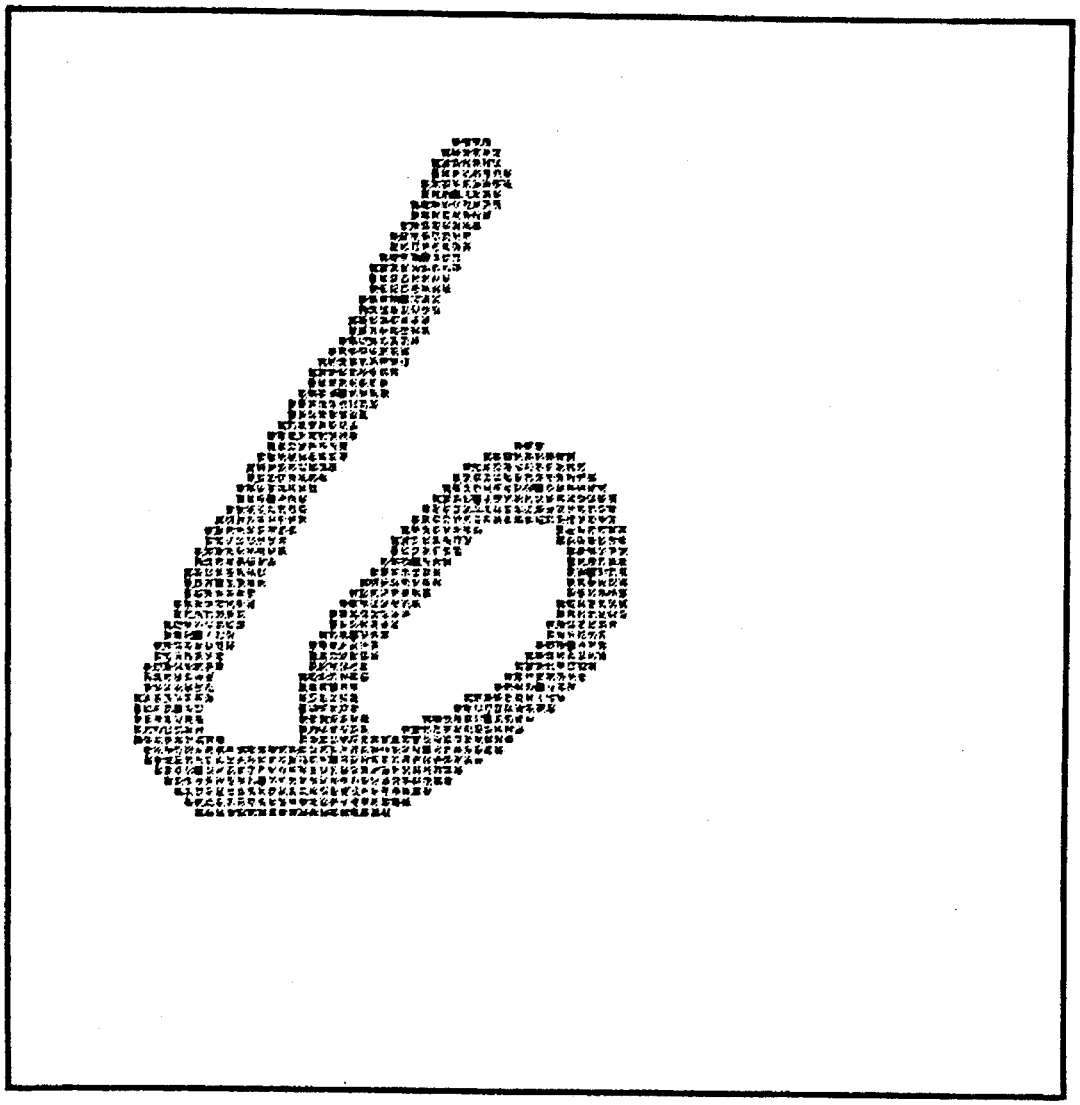

FIGS. 7 and 8 depict the CLIP population after two and four iterations, respectively. After two iterations, the population is already drastically reduced and one can observe the start of a skeleton-like CLIP configuration. After four iterations, the population is reduced further in size although in number it is stabilizing. At this point, most of the surviving CLIPs are still expanding their radii and moving in the bitmap to maximize their fitness. However, the basic skeleton formation is in place.

Figure 9:
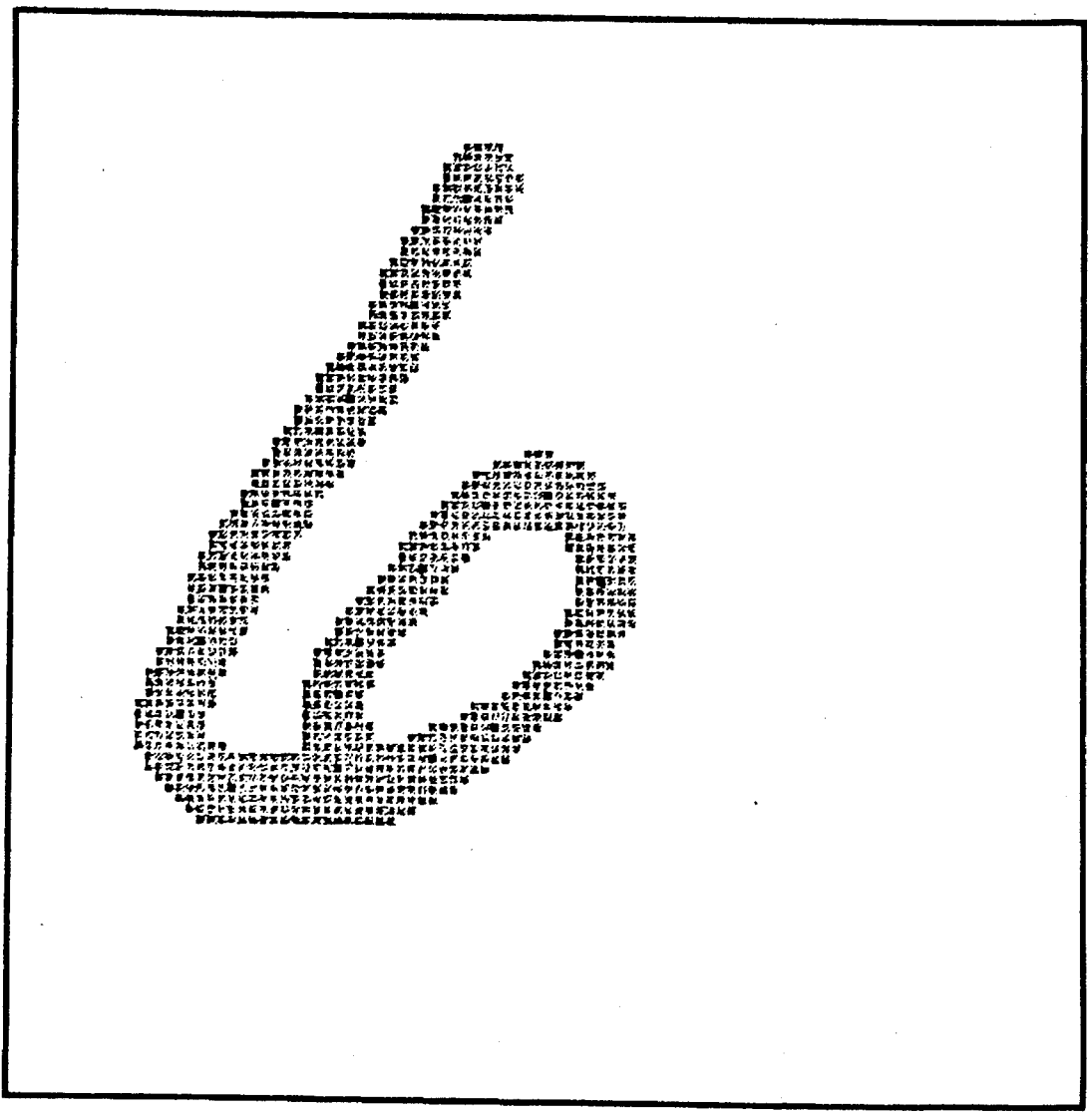

Eventually, a stable state configuration is reached when none of the surviving CLIPs expands, moves, or dies during a single iteration. FIG. 9 illustrates the final stable population configuration for this example. At this point, the radii of most of the CLIPs are sufficiently large (with respect to the character stroke width) that any further expansion or movement will only produce a net influx of background pixels into their local environments and, thus, a net negative impact on their fitness. Hence, a termination condition for this process is easily detectable as the point when a stable CLIP configuration has been reached.

Figure 10:
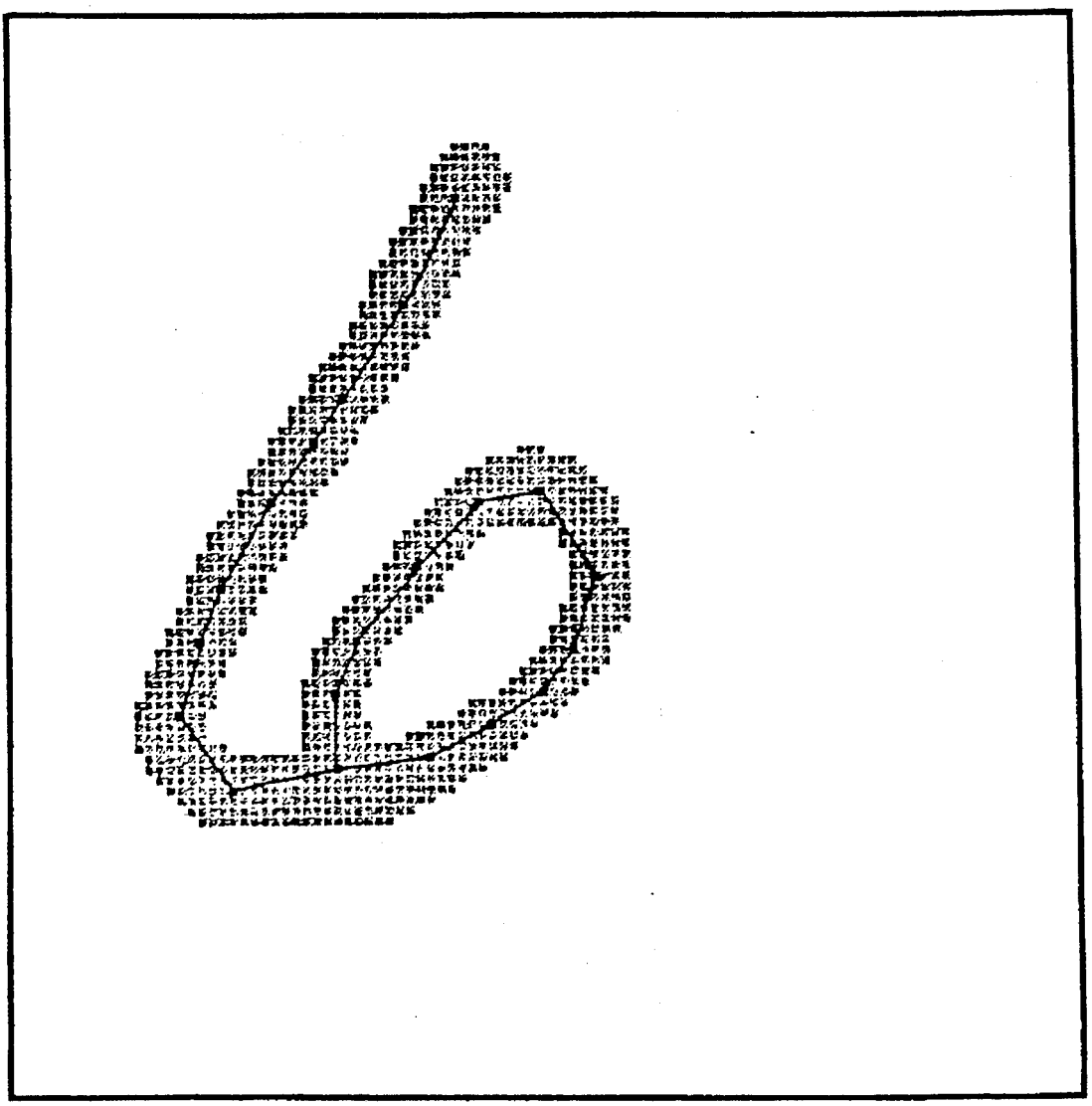

FIG. 10 depicts the resultant character skeleton after the stable state CLIPs of FIG. 9 have been connected. The method for connecting CLIPs to form a character skeleton is a straightforward three step process. First, any CLIPs which overlap each other are connected. Next, any unowned foreground pixels in the bitmap are assigned to the nearest CLIP. Finally, any unconnected CLIPs which own adjacent foreground pixels are connected.

PARALLEL ARCHITECTURE

Figure 11:
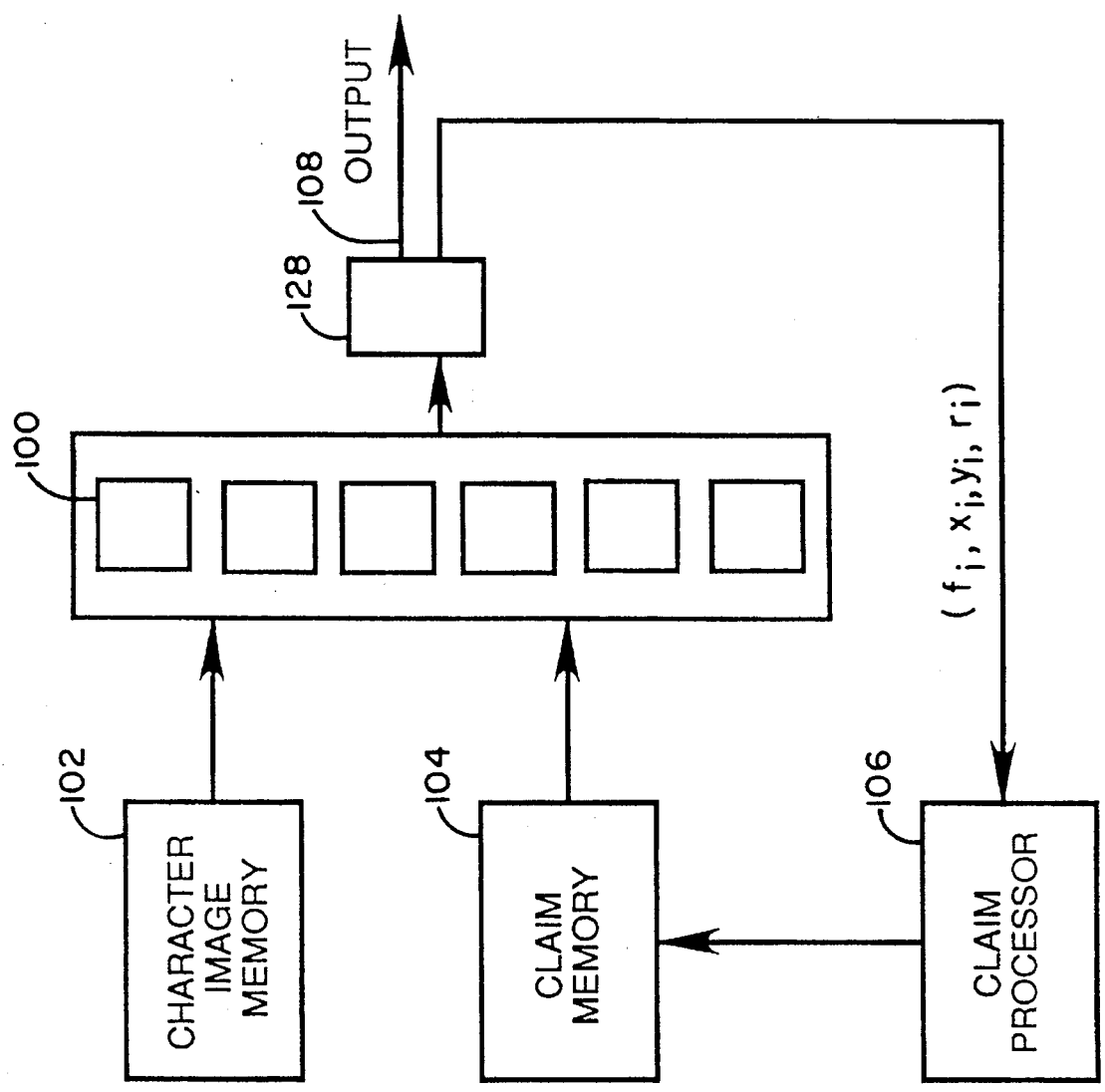
FIG. 11 is a schematic block diagram of a highly parallel architecture hardware for carrying out the present invention.

A highly parallel architecture hardware for carrying out the invention is illustrated in FIG. 11. A plurality of individual CLIP processors 100 operate in parallel, one CLIP processor 100 for each "ON" (foreground) pixel in the character bitmap. The character bitmap is stored in a character image memory 102 which is addressed by each of the individual CLIP processors 100. The ownership of the pixels by the various CLIPs is stored as a record in a claim memory 104. Depending upon the results produced by all of the CLIP processors 100 during a given cyclic iteration, a claim processor 106 updates the claim record stored in the claim memory 104. The claim memory 104 is also addressed by each of the individual CLIP processors 100. Each of the CLIP processors 100 operates in parallel during each cyclic iteration of the process and produces a fitness f, a center location x, y and a radius r. These parameters are transmitted to the claim processor 106. When the process has reached its termination point, the center locations x, y of the surviving CLIPs are produced at the output 108. These locations comprise the locations of points defining the skeletonized version of the characters stored in the memory 102. Downstream optical character recognition apparatus accepts the data from the output 108.

Figure 12:
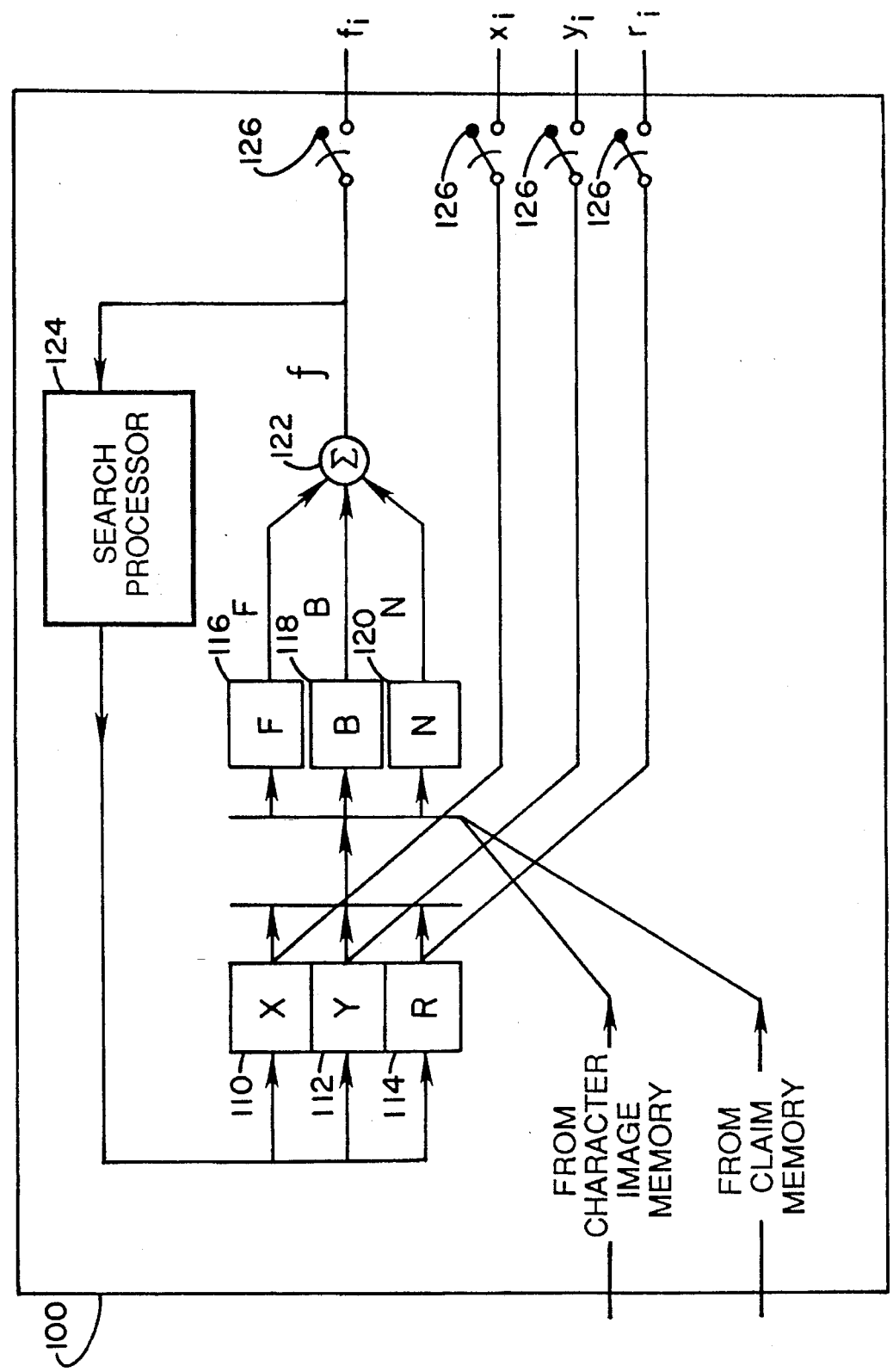
FIG. 12 is a schematic block diagram of a typical CLIP processor employed in the apparatus of FIG. 11.

The typical architecture of each individual CLIP processor 100 is illustrated in FIG. 12. Each CLIP processor 100 includes an X register 110, a Y register 112 and an R register 114 which store the parameters x, y and r, respectively, from which the fitness f is ultimately determined. A foreground processor 116 computes the foreground function F defined in Equations 5 and 6 hereinabove during each cyclic iteration based upon the current contents of the registers 110, 112 and 114 as well as the contents of the claim memory 104 and the character image memory 102. A background processor 118 computes the background function B defined in Equations 2 and 3 hereinabove during each cyclic iteration of the process based upon the contents of the registers 110, 112 and 114, as well as the contents of the character image memory 102 and the claim memory 104. A neighbor processor 120 computes the neighbor function N defined in equations 7 and 8 hereinabove during each cyclic iteration of the process based upon the contents of the registers 110, 112 and 114, as well as the contents of the character image memory 102 and the claim memory 104. The foreground processor 116, the background processor 118 and the neighbor processor 120 each address only those portions of the character image memory 102 and the claim memory 104 corresponding to those pixels within the radius of that CLIP corresponding to the individual CLIP processor 100. The advantage is that each CLIP processor 100 accesses only a very small fraction of the total data stored in the memories 102 and 104 during each cyclic iteration of the process, thereby providing a great advantage in speed of computation.

An adder 122 adds the scalar magnitudes computed during each cyclic iteration of the process by each of the processors 116, 118 and 120 to produce the sum defined by Equation 1, thereby producing a trial value of the fitness f.

A search processor 124 responds to the adder 122 and "jogs" each of the parameters stored in the X register 110, the Y register 112 and the R register 114. These registers store, respectively, the location (x,y) along the X and Y axes of the character bitmap of the center of the corresponding CLIP and the radius r of the CLIP. The search processor 124 varies the contents of each of the registers 110, 112, 114 by predetermined amounts within predetermined ranges, thereby producing a predetermined number of permutations of the combinations of the three parameters x, y and r. With each such permutation, the processors 116, 118 and 120 and the adder 122 produce a new trial fitness f. The search processor 124 responds to each new trial fitness f by storing the corresponding (permuted) value of x, y and r if the latest trial fitness f is greater than the last fitness value stored in the search processor 124. Thus, after the search processor has caused the registers 110, 112 and 114 to store all possible permutations of x, y and r within the prescribed ranges, the search process finally store the values of x, y and r corresponding to the maximum trial fitness.

In the preferred embodiment of the invention, the parameters x, y and r stored in the registers 110, 112 and 114, respectively, are integers corresponding to pixel counts along the x and y axis. The "jogging" performed by the search processor 124 consists in adding the following three numbers to each parameter (x, y and r): +1, 0, −1. This preferred embodiment really consists of three nested "do-loops", which are readily implemented by the skilled worker. In this preferred embodiment, there are 27 possible permutations of these three parameters from which 27 trial values of the fitness f are computed and processed by the search processor 124.

Once the search processor 124 has found the optimum permutation of the parameters x, y and r, it stores the corresponding values in the x, y and r registers 110, 112, 114 and closes switches 126 so that the CLIP processor 100 transmits the maximum trial fitness value f and the corresponding parameters x, y and r to the claim processor 106. The claim processor 106 determines, from the parameters x, y and r output by a successive one of the claim processors 100, the location of each pixel in the memory 102 within the corresponding CLIP (using well-known algebraic techniques). For each pixel, the claim processor 106 stores the fitness and identity of the CLIP in which the pixel resides, unless a CLIP of a previous one of the CLIP processors 100 having a greater fitness f encompasses the same pixel, in which case no change in the claim memory 104 is made for that pixel. When the claim processor 106 is finished, the claim memory 104 stores for each pixel the identity of the CLIP of greatest fitness claiming that pixel. For this purpose, each of the CLIP processors 100 may be identified by a set of arabic numerals 1 through N.

The claim memory 104 informs each of the processors 116, 118 and 120 whether a pixel of interest is owned by the corresponding CLIP. The image memory 102 tells each of the processors 116, 118 and 120 whether a pixel of interest is "ON" or "OFF" or, in other words, is a "foreground" pixel or a "background" pixel.

Upon the completion of each cyclic iteration of the process, a comparison processor 128 (FIG. 11) compares the data transmitted by the array of CLIP processors 100 to the claim processor 106 with the data last transmitted during the previous cyclic iteration. If no significant changes occurred, the process is stabilized, and the current locations of the surviving CLIPs define the thinned character. Accordingly, the comparison processor 128 causes this final result to be transmitted at the output of 108.

Another function performed by the search processor 124 is that, when the optimum set of parameters f, x, y and r have been found for the current cyclic iteration, the search processor 124 refrains from closing those of the switches 126 for which the corresponding fitness value f is less than or equal of zero, thus eliminating the corresponding CLIP.

Figure 13:
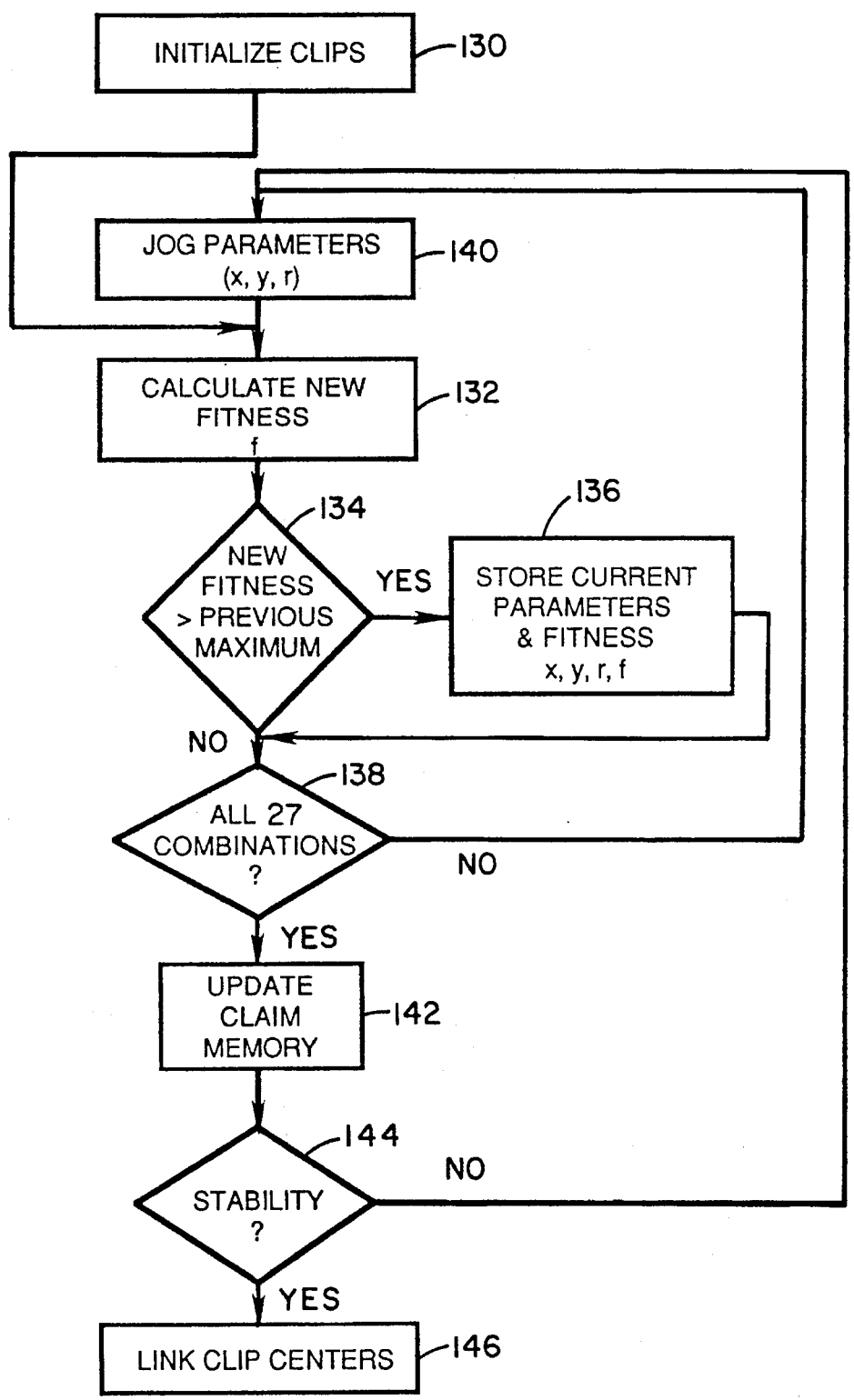
FIG. 13 is a flow diagram of the process performed by the apparatus of FIG. 11.

FIG. 13 illustrates the process performed by the apparatus of FIGS. 11 and 12. The first step (block 130 of FIG. 13) is to initialize the CLIPs. This consists of associating each CLIP processor 100 with a foreground or "ON" pixel in the character bitmap stored in the memory 102. In an alternative embodiment, each clip processor 100 is associated with every 3 pixel by 3 pixel neighborhood of contiguous "ON" pixels or, alternatively, one for every n-by-n neighborhood of contiguous "ON" pixels. The contents of the registers 110 and 112 are thus loaded with the correct x, y location of the corresponding foreground pixel for that CLIP processor 100. The radius r stored in the register 114 is initialized to a value of one pixel in the preferred embodiment. In the alternative embodiment, the initial radius is the size of the initial neighborhood of foreground pixels.

The next step (block 132 of FIG. 13) is to calculate the fitness, which is produced at the output of the adder 122. The next step (block 134 of FIG. 13) is for the search processor 124 to determine whether the current fitness value f is greater than a previous maximum. Since in this first cyclic iteration of the process the answer to this determination is necessarily "yes", the process takes the YES branch of step 134 and the search processor 124 stores the current values of x, y, r and f (block 136 of FIG. 13). The search processor 124 then determines whether it has run through all possible permutations of the parameters x, y and r (block 138 of FIG. 13). Since in this first cyclic iteration the parameters have yet to be jogged (NO branch of block 138) the search processor 124 performs one iteration of jogging the parameters in accordance with the three nested do-loops discussed previously hereinabove (block 140 of FIG. 13). The foregoing steps are repeated until all the permutations of the parameters have been inspected (YES branch of block 138). At this point, the switches 126 are closed by the search processor 124 and the final values for this cyclic iteration of f, x, y and r are transmitted to the claim processor 106. The claim processor 106 responds by updating claim memory 104. It changes the ownership record stored therein for each pixel in accordance with the CLIP of greatest fitness in which the pixel resides (block 142 of FIG. 13). The comparison processor 128 then determines whether stability has been reached (block 144 of FIG. 13).

Stability may be defined in a number of ways. For example, the number of surviving CLIPs may be compared with the number of surviving CLIPs during the previous iteration. In a more sophisticated embodiment, the comparison processor 128 may simply compute a statistical parameter such as the variance of x, y, r and f for all of the CLIP processors 100 in the array and compare the variances achieved during the previous cyclic iteration. If a threshold difference is not found, the comparison processor 128 would then declare that stability has been reached (YES branch of block 144). Otherwise (NO branch of block 144) the process returns to the step of block 140 with the newly configured CLIPs. The NO branch of block 144 corresponds to the completion of one iterative cycle of the process. The YES branch of block 144 corresponds to the completion of the process. At this point, the CLIP center locations x and y are all linked to form a skeletonized graph of a character bit map stored in the memory 102 (block 146 of FIG. 15) by downstream apparatus not shown in FIG. 13.

Figure 14:
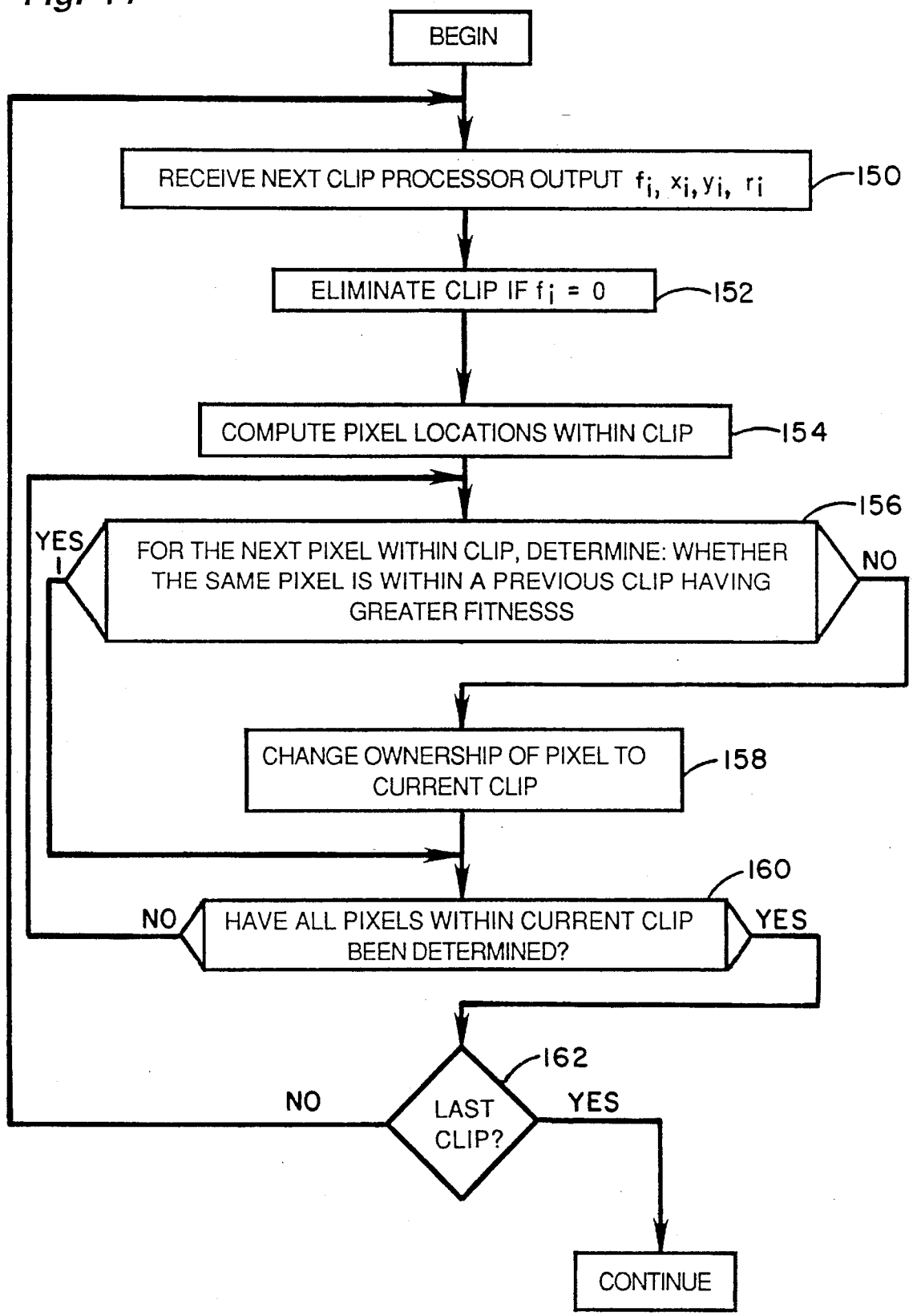
FIG. 14 is a flow diagram illustrating in detail the step of updating the claim memory depicted in the process of claim 13.

The step of block 142 for updating the claim memory performed by the claim processor 106 is illustrated in greater detail in FIG. 14. The first task performed in this step is to receive the next CLIP processor output f, x, y and r (block 150 of FIG. 14). If the fitness value f is less than or equal to zero, the claim processor 106 eliminates it from the claim record in the claim memory 104 (block 152 of FIG. 14). The next task is to compute the pixel locations within the corresponding CLIP from the center location (x,y) of the CLIP and the radius r (block 154 of FIG. 14). Next, the claim processor 106 concerns itself with any pixels which are both within the current CLIP and within a CLIP which has been previously processed during the current cyclic iteration. Specifically, the claim processor 106 determines whether the previous CLIP had a greater fitness (block 156 of FIG. 14). As previously noted herein, pixels which are shared by two (or more) CLIPs must be assigned to the CLIP having the greater fitness. If the previous CLIP had a greater fitness (YES branch of block 156) then the claim processor 106 does not alter the record in claim memory 104 reflecting the previous CLIP's ownership of the current pixel. Otherwise (NO branch of block 156), the current CLIP has a fitness greater than the preceding CLIP claiming the same pixel, and therefore the claim processor 106 changes the record of ownership in the claim memory 104 to reflect ownership by the current CLIP of the current pixel (block 158 of FIG. 14). The claim processor 106 then determines whether all of the pixels within the current CLIP had been updated in the claim memory 104 (block 160). If not (NO branch of block 160), the step of block 156 is repeated for the next pixel. Otherwise (YES branch of block 160), the claim processor 106 determines whether the outputs of all of the CLIP processors 100 had been processed. If not (NO branch of block 162), the process is repeated beginning with the step of block 150. Otherwise (YES branch of block 162) the step of block 142 of FIG. 13 has been completed and the process continues on with the step of block 144 of FIG. 13.

INDUSTRIAL APPLICABILITY

The CLIP-based character thinning process of the invention has been successfully tested on hundreds of handwritten numerals and proven itself to be quite robust. It works well regardless of stroke width and is insensitive to boundary pixel noise. FIG. 15 depicts various examples of results on handwritten numeral data obtained by the invention.

Unlike some thinning techniques which face a difficulty in determining when to stop the thinning process, the invention has an easily detectable, automatic termination condition.

As it is currently implemented, the invention is rather fast and efficient. It does not use any floating point arithmetic since pixel distances to CLIPs are not actually calculated as Euclidean distances. Instead, the distance from a pixel to a CLIP is estimated by which of the r (where r is the CLIP's radius) concentric squares around the CLIP center location the pixel is located in. For example, if a given pixel is in the third concentric square around a particular CLIP center location, its distance to that CLIP is estimated as three. Also contributing to its speed is the invention's ability to quickly converge on a stable state CLIP configuration. Typically, only five to ten iterations were needed for a given character bitmap to produce a skeleton.

Another important potential advantage for the invention is its naturally parallel architecture. Although implemented serially (each CLIP is processed sequentially), the invention lends itself logically to a parallel implementation. Each CLIP could be assigned to an individual, minimally capable processor (which only performs integer addition and multiplication) so that the actions of the entire population could be calculated simultaneously.

An alternative embodiment of the invention using circular shaped CLIPs and a different fitness measure has also been developed and proven to be highly effective in generating useful character skeletons. In both embodiments, the success of the invention derives from allowing a population of independent processing elements to compete and interact without any explicit global control. The resulting emergent behavior proves to be a useful tool for solving a challenging image processing problem.

While the invention has been described in detail by reference to preferred embodiments thereof, it is understood that other variations and modifications thereof can be made without departing from the true spirit and scope of the invention.

What is claimed is:

1. A method of producing a skeleton image of a character bit map comprising pixels of different pixel values using competitive locally independent processes (CLIPs), comprising the steps of:

defining an individual CLIP for each group of a predetermined number of pixels having a predetermined range of pixel values in said character bit map, each individual CLIP characterized by a center location and radius defining the pixels included in said CLIP;

for each individual CLIP varying said center location and said radius over predetermined ranges to produce a predetermined number of permutations of said center location and said radius;

computing a trial fitness value for each of said permutations, said trial fitness value being a function of the values of the pixels included in said CLIP;

storing the maximum trial fitness value of each individual CLIP as the next fitness value of said CLIP and storing the corresponding center location and radius;

eliminating any CLIP having a next fitness value which falls below a predetermined minimum value;

using said next fitness value, repeating said varying step, said computing step, said storing step and said eliminating step for all of the surviving CLIPs; and whenever said repeating step fails to produce change in the next fitness value greater than a predetermined threshold, outputting the center locations of all surviving CLIPs.

2. The method of claim 1 wherein said trial fitness value comprises at least one of: (a) a background function, (b) a foreground function and (c) a neighbor function, wherein:

said background function comprises a sum of background values of all pixels included in an individual CLIP, the background value of each pixel included in an individual CLIP being a negative number of a magnitude which is an inverse function of the pixel value and an inverse function of the distance of the pixel to the center location of the CLIP;

said foreground function comprises a sum of foreground values of all pixels included in an individual CLIP, said foreground value of each pixel included in an individual CLIP being a positive number of a magnitude which is a function of the pixel value and an inverse function of the distance of the pixel from the center location of said CLIP; and said neighbor function comprises a sum neighbor values of all pixels included in an individual CLIP, said neighbor value of each pixel included in an individual CLIP being a negative number if said pixel is included in another CLIP having a greater fitness value than that of said CLIP, said neighbor value being zero otherwise.

3. The method of claim 2 wherein said trial fitness function is the sum of said background, foreground and neighbor functions.

4. The method of claim 2 wherein said positive number of said foreground function has a predetermined finite maximum value corresponding to a distance of zero between said pixel and said center location of an individual CLIP, whereby the existence of an individual CLIP after said eliminating step is not guaranteed solely by having its center location on a pixel of a higher pixel value.

5. The method of claim 2 wherein said negative number of said background function approaches infinity asymptotically as said distance between said pixel and said center location of an individual CLIP approaches zero, whereby an individual CLIP cannot be centered on a background pixel.

6. The method of claim 2 wherein said character bit map is a binary image whereby said higher pixel values all comprise a binary 1 corresponding to foreground pixels and said lower pixel values all comprise a binary 0 corresponding to background pixels, and wherein:

said background function is zero if said pixel is a foreground pixel; and said foreground function is zero if said pixel is a background pixel.

7. The method of claim 1, further comprising for each pixel, determining from the center location and radius corresponding to said next fitness value of all CLIPs the identity of an individual CLIP of the greatest next fitness value in which said pixel is included and recording said identity, wherein said repeating step comprises referring to said identity when computing said trial fitness function whenever an individual CLIP includes a pixel included in another CLIP.

8. The method of claim 1 wherein said character bit map is stored in a memory, and wherein said step of computing said trial fitness comprises addressing only those portions of said memory corresponding to pixels included in an individual CLIP.

9. The method of claim 1 further comprising the steps of:

connecting together the center locations of surviving CLIPs which share common pixels;

assigning pixels characterized by an "ON" pixel value which are not contained in a surviving CLIP to the nearest one of said surviving CLIPs; and connecting together CLIPs containing adjacent pixels characterized by an "ON" pixel value.

10. The method of claim 1 wherein said change is determined with respect to at least one of: (a) the number of CLIPs existing after the most recent repetition of said eliminating step and (b) a function of the radii of said CLIPs, and wherein said predetermined threshold comprises at least one of (a) a predetermined function of the number of CLIPs surviving prior to the previous repetition of said eliminating step and (b) a function of the radii of all CLIPs prior to the previous repetition of said steps.

11. Apparatus for producing a skeleton image of a character bit map comprising pixels of different pixel values using competitive locally independent processes (CLIPs), comprising:

(A) an image memory for storing each pixel value of said character bit map;

(B) a CLIP processor array connected to said image memory and comprising an individual CLIP processor for each group of a predetermined number of pixels having a predetermined range of pixel values in said character bit map, each CLIP processor corresponding to an individual CLIP characterized by a center location and radius defining the pixels included in said CLIP, all CLIP processors operating in parallel during iterative cycles, each CLIP processor comprising:

(1) search processor means for varying said center location and said radius over predetermined ranges to produce a predetermined number of permutations of said center location and said radius during each iterative cycle, (2) fitness processor means for computing a trial fitness value for each of said permutations during each iterative cycle, said trial fitness value being a function of the values of the pixels included in said CLIP, (3) register means for storing the maximum trial fitness value as the next fitness value of said CLIP and storing the corresponding center location and radius for use during the next iterative cycle, (4) means for eliminating said CLIP if said next fitness value falls below a predetermined minimum value; and (C) comparison processor means connected to all of said CLIP processors and responsive whenever two successive ones of said iterative cycles do not correspond to a change in said CLIPs greater than a predetermined threshold for outputting the center locations of all surviving CLIPs.

12. The apparatus of claim 11 wherein said fitness processor means comprises at least one of: (a) a background function processor, (b) a foreground function processor and (c) a neighbor function processor, wherein:

said background function processor comprises means for computing a sum of background values of all pixels included in said CLIP, the background value of each pixel included in said CLIP being a negative number of a magnitude which is an inverse function of the pixel value and an inverse function of the distance of the pixel to the center location of the CLIP;

said foreground function processor comprises means for computing a sum of foreground values of all pixels included in said CLIP, said foreground value of each pixel included in said CLIP being a positive number of a magnitude which is a function of the pixel value and an inverse function of the distance of the pixel from the center location of said CLIP; and said neighbor function processor comprises means for computing a sum of neighbor values of all pixels included in said CLIP, said neighbor value of each pixel included in said CLIP being a negative number if said pixel is included in another CLIP having a greater fitness value than that of said CLIP, said neighbor value being zero otherwise.

13. The apparatus of claim 12 wherein said fitness processor means comprise all of said background, foreground and neighbor function processors and means for summing the outputs of said background, foreground and neighbor function processors.

14. The apparatus of claim 12 wherein said positive number of said foreground function has a predetermined finite maximum value corresponding to a distance of zero between said pixel and said center location of said CLIP, whereby the existence of said CLIP after said eliminating step is not guaranteed solely by having its center location on a pixel of a higher pixel value.

15. The apparatus of claim 12 wherein said negative number of said background function approaches infinity asymptotically as said distance between said pixel and said center location of said CLIP approaches zero, whereby said CLIP cannot be centered at a pixel of lower value.

16. The apparatus of claim 12 wherein said character bit map is a binary image whereby said higher pixel values all comprise a binary 1 corresponding to foreground pixels and said lower pixel values all comprise a binary 0 corresponding to background pixels.

17. The apparatus of claim 16 wherein said predetermined number of pixels is 1.

18. The apparatus of claim 11, further comprising a claim memory and a claim processor, said claim processor comprising means for determining for each pixel in said image memory from the center location and radius corresponding to said next fitness value of all CLIPs the identity of an individual CLIP of the greatest next fitness value in which said pixel is included and for recording said identity in said claim memory, wherein each CLIP processor addresses said identity in said claim memory in computing said trial fitness function whenever said CLIP includes a pixel included in another CLIP.

19. The apparatus of claim 11 wherein said CLIP processor comprises means for addressing only those portions of said image memory corresponding to pixels included in said CLIP.

20. The apparatus of claim 11 wherein said comparison processor is characterized in that said change is determined with respect to at least one of: (a) the number of CLIPs existing after the most recent repetition of said eliminating step and (b) a function of the radii of said CLIPs, and wherein said predetermined threshold comprises at least one of (a) a predetermined function of the number of CLIPs surviving prior to the previous repetition of said eliminating step and (b) a function of the radii of all CLIPs prior to the previous repetition of said steps.

* * * * *